(12) United States Patent
Shimizu

(10) Patent No.: US 11,543,275 B2
(45) Date of Patent: Jan. 3, 2023

(54) MASS FLOW SENSOR, MASS FLOW METER INCLUDING THE MASS FLOW SENSOR, AND MASS FLOW CONTROLLER INCLUDING THE MASS FLOW SENSOR

(71) Applicant: Fujikin Incorporated, Osaka (JP)

(72) Inventor: Tsunehisa Shimizu, Osaka (JP)

(73) Assignee: Fujikin Incorporated, Osaka (JP)

( * ) Notice: Subject to any disclaimer, the term of this patent is extended or adjusted under 35 U.S.C. 154(b) by 585 days.

(21) Appl. No.: 16/497,191

(22) PCT Filed: Mar. 9, 2018

(86) PCT No.: PCT/JP2018/009338
§ 371 (c)(1),
(2) Date: Sep. 24, 2019

(87) PCT Pub. No.: WO2018/180387
PCT Pub. Date: Oct. 4, 2018

(65) Prior Publication Data
US 2020/0096373 A1   Mar. 26, 2020

(30) Foreign Application Priority Data

Mar. 30, 2017   (JP) .............................. JP2017-067902

(51) Int. Cl.
*G01F 1/68* (2006.01)
*G01F 1/69* (2006.01)
(Continued)

(52) U.S. Cl.
CPC .............. *G01F 1/69* (2013.01); *G01F 1/6847* (2013.01); *G05D 7/0635* (2013.01); *G01F 1/684* (2013.01); *G01F 1/86* (2013.01); *G05D 7/06* (2013.01)

(58) Field of Classification Search
CPC .......... G01F 1/69; G01F 1/6847; G01F 1/684; G01F 1/86; G05D 7/0635; G05D 7/06
(Continued)

(56) References Cited

U.S. PATENT DOCUMENTS 4,519,246 A * 5/1985 Hartemink ............ G01F 1/6847
73/204.22
4,815,280 A * 3/1989 Tujimura .............. G01F 1/6847
73/204.22
(Continued)

FOREIGN PATENT DOCUMENTS

| CN | 102187183 A | 9/2011 |
|---|---|---|
| JP | 1164060 A | 3/1999 |
| JP | 5505419 B2 | 3/2014 |

OTHER PUBLICATIONS

Office Action issued in CN201880022314.8 dated Jun. 3, 2020.

*Primary Examiner* — Minh Q Le
(74) *Attorney, Agent, or Firm* — The Webb Law Firm

(57) ABSTRACT

A mass flow sensor is provided with reduced zero point fluctuation, and a mass flow meter and a mass flow controller using the mass flow sensor, the mass flow sensor comprising a U-shaped flow path passage in which a fluid flows from first end to a second end, having a bottom portion and two straight portions connecting the bottom portion to the ends, a first thermal resistor wound around one of the straight portions, a second thermal resistor wound around the same straight portion as the first thermal resistor and provided away from the first thermal resistor toward the second end, and a heat dissipating portion provided so as to be in contact with the flow path passage on the side opposite to the second thermal resistor across the first thermal resistor.

7 Claims, 3 Drawing Sheets

(51) Int. Cl.
*G01F 1/684* (2006.01)
*G05D 7/06* (2006.01)
*G01F 1/86* (2006.01)

(58) Field of Classification Search
USPC ........ 137/487.5; 73/204.11, 204.12, 204.13, 73/204.17, 204.19, 204.22, 204.23
See application file for complete search history.

(56) References Cited

U.S. PATENT DOCUMENTS

| | | | | | |
|---|---|---|---|---|---|
| 5,191,793 | A * | 3/1993 | Drexel | ................ | G01F 1/6847 |
| | | | | | 73/204.25 |
| 5,347,861 | A * | 9/1994 | Satoh | ................ | G01F 1/6847 |
| | | | | | 73/204.22 |
| 6,318,171 | B1 * | 11/2001 | Suzuki | ................ | G01F 1/6847 |
| | | | | | 73/204.27 |
| 7,437,928 | B2 * | 10/2008 | Bos | ................ | G01F 15/18 |
| | | | | | 73/204.22 |
| 7,971,480 | B2 | 7/2011 | Smirnov et al. | | |
| 9,791,307 | B2 * | 10/2017 | Hartman | ................ | G01F 1/684 |
| 2003/0115951 | A1 * | 6/2003 | Ambrosina | ................ | G05D 7/0635 |
| | | | | | 73/204.22 |
| 2008/0196494 | A1 * | 8/2008 | Suzuki | ................ | G01F 1/6847 |
| | | | | | 73/204.25 |
| 2010/0089459 | A1 * | 4/2010 | Smirnov | ................ | G01F 5/00 |
| | | | | | 73/204.15 |
| 2010/0326539 | A1 * | 12/2010 | Smirnov | ................ | G01F 1/6847 |
| | | | | | 73/204.11 |
| 2011/0061841 | A1 * | 3/2011 | Zolock | ................ | G01F 5/00 |
| | | | | | 165/185 |
| 2015/0234393 | A1 * | 8/2015 | Kehoe | ................ | G05D 7/0635 |
| | | | | | 137/455 |
| 2017/0102095 | A1 * | 4/2017 | Kunita | ................ | G05D 7/0635 |
| 2017/0168035 | A1 * | 6/2017 | Albright | ................ | G01F 1/69 |
| 2017/0276524 | A1 * | 9/2017 | Otsuka | ................ | G01F 1/6847 |
| 2018/0150088 | A1 * | 5/2018 | Okano | ................ | F16K 37/005 |
| 2019/0050003 | A1 * | 2/2019 | Banares | ................ | G05D 7/0635 |

* cited by examiner

MASS FLOW SENSOR, MASS FLOW METER INCLUDING THE MASS FLOW SENSOR, AND MASS FLOW CONTROLLER INCLUDING THE MASS FLOW SENSOR

CROSS-REFERENCE TO RELATED APPLICATIONS

This application is the United States national phase of International Application No. PCT/JP2018/009338 filed Mar. 9, 2018, and claims priority to Japanese Patent Application No. 2017-067902 filed Mar. 30, 2017, the disclosures of which are hereby incorporated by reference in their entirety.

TECHNICAL FIELD

The present invention relates to a mass flow sensor, a mass flow meter including the mass flow sensor, and a mass flow controller including the mass flow sensor.

BACKGROUND ART

A mass flow meter or a mass flow controller for horizontally flowing a fluid is provided so that a U-shaped sensor tube is arranged with a U-shaped bottom portion facing upward, and a pair of sensor elements are provided horizontally side by side on the U-shaped bottom portion.

On the other hand, when such a mass flow meter or a mass flow controller is disposed so as to flow a fluid in a vertical direction, there is a problem that a zero point fluctuates due to the thermal siphoning phenomenon as described with reference to FIG. 7 in Japanese Patent Application Laid-open Publication No. 11-64060.

The thermal siphoning phenomenon (also referred to as a thermal siphoning phenomenon) is a phenomenon that occurs when a mass flow meter or a mass flow controller is arranged so as to flow a fluid in a vertical direction, that is, if a pair of sensor elements are arranged in a vertical direction and the fluid pressure on the primary side is high, a phenomenon occurs when used for gases with a high molecular weight, and this is a phenomenon in which the fluid heated by the sensor element rises in the sensor pipe, joins the main flow path (so-called bypass portion), the fluid cooled in the main flow path drops, and flows back into the sensor pipe.

If this thermal siphoning phenomenon occurs, even if no fluid flows to the mass flow meter or the mass flow controller (flow rate is zero), the fluid in the sensor tube moves, so that the sensor element senses the flow rate and a zero point variation occurs.

In response to Japanese Patent Application Laid-open Publication No. 11-64060, preventing the thermal siphoning phenomenon is possible even if the mass flow meter or the mass flow controller is arranged so that the fluid flows in the vertical direction.

However, in recent years, particularly in the semiconductor field, integration of systems equipped with mass flow meters and mass flow controllers has progressed, and increasing the tube length of a sensor tube or adding a heater is difficult in a situation where miniaturization of the mass flow meter and the mass flow controller is required.

So, by arranging the U-shaped opening in the horizontal direction and arranging the sensor element (thermal resistor) in the horizontal direction on a pair of side portions of the U-shape for a mass flow meter or a mass flow controller which flows a fluid in the vertical direction, suppressing zero point fluctuation due to thermal siphoning phenomenon is possible, but in situations where higher accuracy is required, the zero point fluctuation caused by the collapse of the heat balance of the pair of sensor elements due to the influence of the heat dissipating by the main body block to which the end portion of the sensor pipe is connected when the flow rate is zero becomes a problem.

Note that the zero point refers to a state in which no fluid flows through the mass flow meter or the mass flow controller, and refers to a state where there is no difference in temperature sensed by the two sensor elements.

The temperature distribution of the sensor tube at the zero point is the highest in the middle of the two sensor elements, and the temperature decreases as the distance from the middle increases, indicating a line-symmetric peak.

SUMMARY OF THE INVENTION

The present invention has been made in view of the above circumstances, and an object thereof is to provide a mass flow sensor with reduced zero point fluctuation, a mass flow meter including the mass flow sensor, and a mass flow controller including the mass flow sensor.

The present invention is grasped by the following composition in order to achieve the above-mentioned object.

(1) A mass flow sensor of the present invention has a U-shaped flow path passage in which fluid flows from a one end portion to another end portion having a bottom portion and two straight portions which connect the bottom portion to the end portions, a first thermal resistor wound around any one of the straight portions, a second thermal resistor wound around the straight portion around which the first thermal resistor is wound, and provided away from the first thermal resistor toward the one end portion, and a heat dissipating portion provided so as to be in contact with the flow path tube on the side opposite to the second thermal resistor across the first thermal resistor.

(2) In the configuration of the above (1), wherein the mass flow sensor includes a weld base having a terminal to which ends of the first thermal resistor and the second thermal resistor are connected and the heat dissipating portion is part of the weld base.

(3) In the configuration of the above (2), wherein the heat dissipating portion is fixed to the flow path passage, and the flow path passage is held by the weld base.

(4) In any of the above configurations (1) through (3), wherein the heat dissipating portion is formed of a material having a thermal conductivity of 100 W/m or more at 0 degrees.

(5) In any of the above configurations (1) through (4), wherein the flow path passage is disposed with the U-shaped opening side directed in a horizontal direction (6) A mass flow meter of the present invention comprising a main flow path through which fluid flows, a mass flow sensor according to any one of configurations 1 to 5, and an output unit for outputting a signal related to the flow rate of the fluid detected by the mass flow sensor to the outside, wherein each end of the flow path passage of the mass flow sensor is connected to the main flow path.

(7) A mass flow controller of the present invention comprises a main flow path through which fluid flows, a mass flow sensor according to any one of configurations 1 to 5, and a flow rate adjustment valve for adjusting the flow rate of the fluid flowing in the main flow path to a set flow rate based on the flow rate of the fluid provided on the outlet side of the main flow path and detected by the mass flow sensor, wherein each end of the flow path passage of the mass flow sensor is connected to the main flow path.

According to the present invention, a mass flow sensor with reduced zero point fluctuation, a mass flow meter including the mass flow sensor, and a mass flow controller including the mass flow sensor is able to be provided.

DETAILED DESCRIPTION OF THE INVENTION

Figure 1:
FIG. 1 is a sectional view of a mass flow controller including a mass flow sensor according to a first embodiment of the present invention.

Hereinafter, modes for carrying out the present invention (hereinafter referred to as "embodiments") will be described in detail with reference to the accompanying drawings.

Note that throughout the description of the embodiments, the same elements are denoted by the same reference numerals.

First Embodiment

Figure 2:
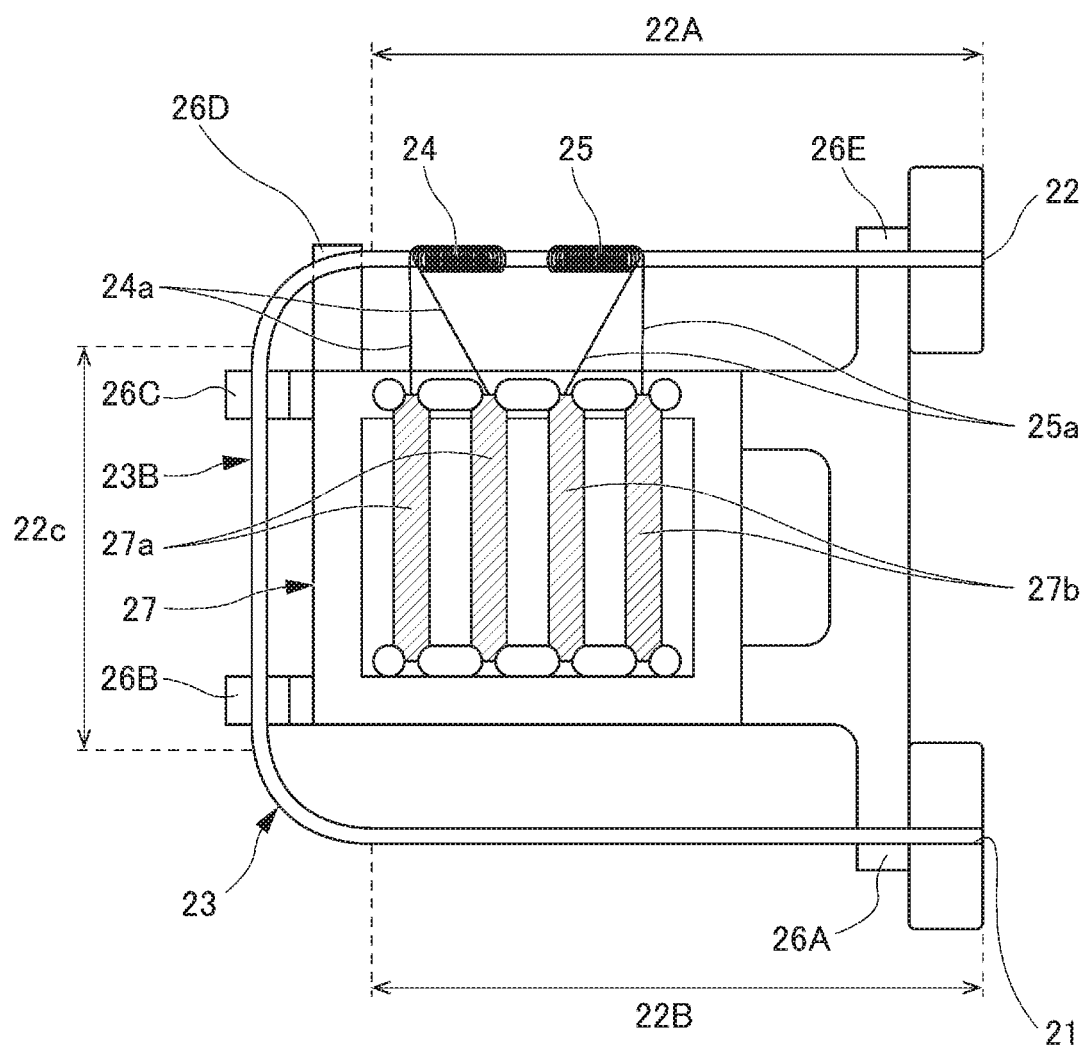
FIG. 2 is a cross-sectional view showing the main part of the mass flow sensor according to the first embodiment of the present invention.

FIG. 1 is a cross-sectional view of a mass flow controller 1 including a mass flow sensor 20 according to a first embodiment of the present invention, and FIG. 2 is a sectional view showing the main part of the mass flow rate sensor 20 of the first embodiment according to the present invention.

Note that the upper and lower sides in FIGS. 1 and 2 indicate the upper side and the lower side during normal use.

Hereinafter, the mass flow rate sensor 20 of the present embodiment will be described while the mass flow controller 1 is described.

As shown in FIG. 1, the mass flow controller 1 includes a main body block 10 and a housing 19 attached to the main body block 10.

The main body block 10 comprises a main flow path having a first main flow path 11 extending from the first opening 10a serving as a fluid inlet, a second main flow path 12 extending from the first main flow path 11, and a third main flow path 13 extending from the second opening 10b serving as a fluid outlet.

Note that a connection joint (not shown) for connection with a pipe through which a fluid flows is attached to the first opening 10a and the second opening 10b.

The first main flow path 11 is a straight flow path having an inner diameter D1 extending from the first opening 10a to the second opening 10b.

Also, the second main flow path 12 has a substantially L-shaped flow path, and the second main flow path 12 includes a first flow path 12a having an inner diameter D2 smaller than the inner diameter D1 and extending linearly from an end 11a of the first main flow path 11 opposite the first opening 10a to the second opening 10b side, and a second flow path 12b extending f to the housing 19 side and communicating with the outside of the main body block 10.

Further, the third main flow path 13 has a substantially L-shaped flow path, and the third main flow path 13 includes a third flow path 13a extending linearly from the second opening 10b to the first opening 10a side, and having a different diameter with a large inner diameter D3 on the second opening 10b side and a smaller inner diameter D4 on the first opening 10a side, and a fourth flow path 13b extending from the end of the third flow path 13a on the first opening 10a side to the housing 19 side and communicating with the outside of the main body block 10.

Note that inner diameter D1 of the first main flow path 11 and the inner diameter D3 of the third main flow path 13 on the second opening 10b side of the third flow path 13a have substantially the same inner diameter corresponding to a connection joint (not shown) for connection with a pipe.

Also, the inner diameter D2 of the first flow path 12a of the second main flow path 12 and the inner diameter D4 of the third main flow path 13 on the first opening portion 10a side of the third flow path 13a have substantially the same inner diameter.

Then, the mass flow controller 1 is accommodated in the housing 19, and is provided with a flow rate control valve 14 provided on the outlet (second opening 10b) side of the main flow path so as to cover the opening 12ba communicating with the outside of the second flow path 12b and the opening 13ba communicating with the outside of the fourth flow path 13b which are arranged side by side from the first opening 10a side toward the second opening 10b side.

As an example, a solenoid valve driven by a solenoid, a piezo valve driven by a piezo actuator, or the like is used as the flow rate control valve 14, and based on the flow rate of the fluid detected by the mass flow rate sensor 20 to be described later, the flow rate control valve functions as a flow rate regulating valve that adjusts the flow rate of the fluid flowing in the main flow path to a set flow rate.

On the other hand, the main body block 10 includes a straight first branch flow path 11b having a small inner diameter extending from the middle part of the first main flow path 11 to the housing 19 side and communicates with the outside of the main body block 10, and a straight second branch flow path 11c having a small inner diameter extending from the position on the end 11a side with respect to the first branch flow path 11b of the first main flow path 11 to the housing 19 side and communicating with the outside of the main body block 10, and between the first branch flow path 11b and the second branch flow path 11c in the first main flow path 11, a bypass element 15 characterized by having a constant flow rate is provided.

Then, part of the fluid flowing in the main flow path (first main flow path 11) is supplied to the mass flow rate sensor 20 described later through the first branch flow path 11b, and the fluid that has passed through the mass flow rate sensor 20 merges again into the main flow path (first main flow path 11) through the second branch flow path 11c.

Also, the mass flow controller 1 includes a control unit 16 housed in a housing 19.

The control unit 16 includes a bridge circuit for obtaining resistance values of a first thermal resistor 24 and a second thermal resistor 25 of the mass flow rate sensor 20 described later, functions as a calculation unit of the mass flow rate sensor 20 that calculates the flow rate of the fluid flowing in the main flow path from the change in resistance value.

Also, the control unit 16 includes an amplification circuit, a comparison control circuit that controls the flow rate control valve 14 by comparing the set flow rate and the flow rate flowing through the main flow path, and generally controls the mass flow controller 1.

Furthermore, the mass flow controller 1 includes an input/output unit 17 (for example, an input/output connector) that is provided on the outer periphery of the housing 19 and is electrically connected to the control unit 16, and is capable of receiving (inputting) a signal relating to a set flow rate input from an external device and transmitting (outputting) a signal relating to a flow rate of a fluid in the main flow path to an external device.

Next, the mass flow rate sensor 20 will be described in detail with reference to FIG. 2.

As shown in FIG. 2, the mass flow rate sensor 20 includes a U-shaped flow path passage 23 having a bottom portion 23B and two straight portions (a straight portion 22A and a straight portion 22B) connected to the bottom portion 23B and end portions (a first end portion 21 and a second end portion 22) in which fluid flows from one end portion (also referred to as the first end portion 21) to another end portion (also referred to as the second end portion 22) with the U-shape opening in a horizontal direction.

Note that the "U" shape in the present application includes not only shapes having a curved bottom but also shapes in which the bottom is straight, i.e., a so-called "U" shape Also, the mass flow rate sensor 20 includes a first thermal resistor 24 wound around a straight portion 22A on the second end portion 22 side of the flow path passage 23, and a second thermal resistor 25 wound around a straight portion 22A around which the first thermal resistor 24 is also wound, which is provided so as to be separate from the first thermal resistor 24 toward the second end portion 22.

Note that the fluid flowing out from the first branch flow path 11b of the main body block 10 shown in FIG. 1 is supplied to the first end portion 21 of the flow path passage 23, and the fluid flowing out from the second end portion 22 of the flow path passage 23 is supplied to the second branch flow path 11c of the main body block 10 shown in FIG. 1.

Further, the mass flow rate sensor 20 further includes a weld base 27 having a pair of terminals 27a to which the lead wire portions 24a from the coil-shaped first thermal resistor 24 wound around the straight portion 22A are connected and a pair of terminals 27b to which the lead wire portions 25a from the coil-shaped second thermal resistor 25 wound around the straight portion 22A are connected.

Note that the resistance values of the first thermal resistor 24 and the second thermal resistor 25 are adjusted by adjusting the lengths of the lead wire portions 24a and the lead wire portions 25a.

Then, the pair of terminals 27a and the pair of terminals 27b of the weld base 27 are electrically connected to the control unit 16, and the flow rate of the fluid flowing through the main flow path of the main body block 10 is determined based on the change in the resistance values of the first thermal resistor 24 and the second thermal resistor 25 caused by the temperature change when the fluid flows through the flow path passage 23.

The weld base 27 has a plurality of arm portions 26A to 26E which are fixed to the U-shaped flow path passage 23 with an adhesive.

Then, by holding the flow path passage 23 which is a small diameter pipe with the weld base 27, because the shape stability of the flow path passage 23 is increased, the flow path passage 23 can be prevented from being damaged by vibration or the like.

More specifically, the weld base 27 includes an arm portion 26A that extends to a position near the first end portion 21 of the straight portion 22B on the first end portion 21 side of the flow path passage 23 and is fixed to the flow path passage 23 by an adhesive, and a pair of arm portions 26B and 26C that extend to both end positions of the straight portion 22C of the U-shaped lower portion and are fixed to the flow path passage 23 by an adhesive.

In addition, the weld base 27 includes an arm portion 26E which extends to a position near the second end portion 22 of the straight portion 22A on the second end portion 22 side of the flow path passage 23 and is fixed to the flow path passage 23 by an adhesive, and an arm portion 26D which is provided so as to be in contact with the flow path passage 23 adjacent to the first thermal resistor 24 on the side opposite to the second thermal resistor 25 with the first thermal resistor 24 interposed therebetween and is fixed by an adhesive, and the arm portion 26D which is a part of the weld base 27 functions as the heat dissipating portion 26.

Therefore, the arm portion 26D preferably functions as the heat dissipating portion 26 which is formed of a material having a high heat dissipation property.

For example, the arm portion 26D functioning as the heat dissipating portion 26 is preferably formed of a material having a thermal conductivity of 100 W/m·K or more at 0 degrees.

Note that the weld base 27 only needs to be insulated from the portions where current flows, such as the pair of terminals 27a and the pair of terminals 27b.

Therefore, if a material such as a metal having a high heat dissipating property is used as a member serving as a base of the weld base 27, and the member serving as the base is insulated from a portion in which a current flows, such as the pair of terminals 27a and the pair of terminals 27b, the heat dissipating property through the heat dissipating portion 26 can be further enhanced.

Then, such a heat radiating section 26 in which the variation of the zero point (0 output) of the mass flow rate sensor 20 is able to be suppressed will be described below.

As shown in FIG. 1, with respect to the mass flow rate sensor 20, because the first end portion 21 and the second end portion 22 of the flow path passage 23 (see FIG. 2) are on the main body block 10 side, and because the first end portion 21 side and the second end portion 22 side are easily able to dissipate heat to the main body block 10, the second thermal resistor 25 arranged on the main body block 10 side is easily deprived of heat.

On the other hand, since the first thermal resistor 24 located at a position away from the main body block 10 does not radiate heat to the main body block 10 side, not much heat is dissipated.

Because of this, if the heat dissipating portion 26 is not provided, the fluid flows from the first end portion 21 to the second end portion 22 side, the temperature of the region of the first thermal resistor 24 is lowered by the flow of the fluid, and the fluid heated by the first thermal resistor 24 passes through the region of the second thermal resistor 25, whereby the temperature difference between the regions of the first thermal resistor 24 and the second thermal resistor 25 is eliminated when the temperature of the region of the second thermal resistor 25 rises.

However, a state in which there is no temperature difference between the regions of the first thermal resistor 24 and the second thermal resistor 25 (a state in which there is no difference between the resistance values of the first thermal resistor 24 and the second thermal resistor 25) usually means a state in which no fluid flows.

That is, when the fluid flows to such an extent that the temperature difference between the first thermal resistor 24 and the second thermal resistor 25 is eliminated, the output becomes zero (i.e., output when no fluid is flowing) and the zero output fluctuates.

On the other hand, when the heat dissipating portion 26 is provided so as to be in contact with the flow path passage 23 on the side opposite to the second thermal resistor 25 with the first thermal resistor 24 interposed therebetween, since the first thermal resistor 24 side is radiated to the heat dissipating portion 26 side, realizing a state similar to that where the second thermal resistor 25 side is radiated to the main body block 10 side is possible.

That is, the heat dissipating portion 26 plays the role of balancing the heat of the first thermal resistor 24 and the second thermal resistor 25.

Therefore, even if the fluid does not flow, the temperature difference between the regions of the first thermal resistor 24 and the second thermal resistor 25 is eliminated, and when the fluid is not flowing, 0 output is output correctly.

Conversely, when the fluid flows, a temperature difference occurs between the regions of the first thermal resistor 24 and the second thermal resistor 25, so that an output corresponding to the flow of the fluid is output.

In the present embodiment, the case where a part of the weld base 27 is the heat dissipating portion 26 has been described, but the heat dissipating portion 26 does not need to be a part of the weld base 27, and a member having a high heat radiating property may be independently provided in the same place as the arm portion 26D.

Moreover, in this embodiment, although the case where the thermal radiation part 26 was fixed to the flow path passage 23 with an adhesive agent was demonstrated, but the heat dissipating portion 26 does not need to be fixed with an adhesive, and may be at least in contact with the flow path passage 23.

Furthermore, in the present embodiment, although a case where the first thermal resistor 24 and the second thermal resistor 25 are wound around the straight portion 22A on the second end portion 22 side of the flow path passage 23, and the heat dissipating portion 26 is provided so as to be in contact with the flow path pipe 23 on the side opposite to the second thermal resistor 25 with the first thermal resistor 24 interposed therebetween is shown, but the configuration may be provided in the straight portion 22B on the first end portion 21 side.

That is, the mass flow rate sensor 20 may include a first thermal resistor 24 wound around the straight portion 22B on the first end portion 21 side of the flow path passage 23, a second thermal resistor 25 wound around the straight portion 22B around which the first thermal resistor 24 is also wound, provided away from the first thermal resistor 24 toward the first end portion 21 side, and a heat dissipating portion 26 provided so as to be in contact with the flow path passage 23 adjacent to the first thermal resistor 24 on the side opposite to the second thermal resistor 25 with the first thermal resistor 24 interposed therebetween.

Even in this case, the heat dissipating portion 26 radiates heat on the first thermal resistor 24 side away from the main body block 10, and since the temperature state on the first thermal resistor 24 side is the same state as the temperature state on the second thermal resistor 25 side radiated to the main body block 10 side, the same effect as described above is exhibited.

Although the case of the mass flow controller 1 has been described in the first embodiment, the mass flow rate sensor 20 described in the first embodiment is not limited to being used in the mass flow controller 1, and may be used in the mass flow meter 2.

Therefore, the mass flow meter 2 including the mass flow rate sensor 20 of the first embodiment will be described as the second embodiment.

Figure 3:
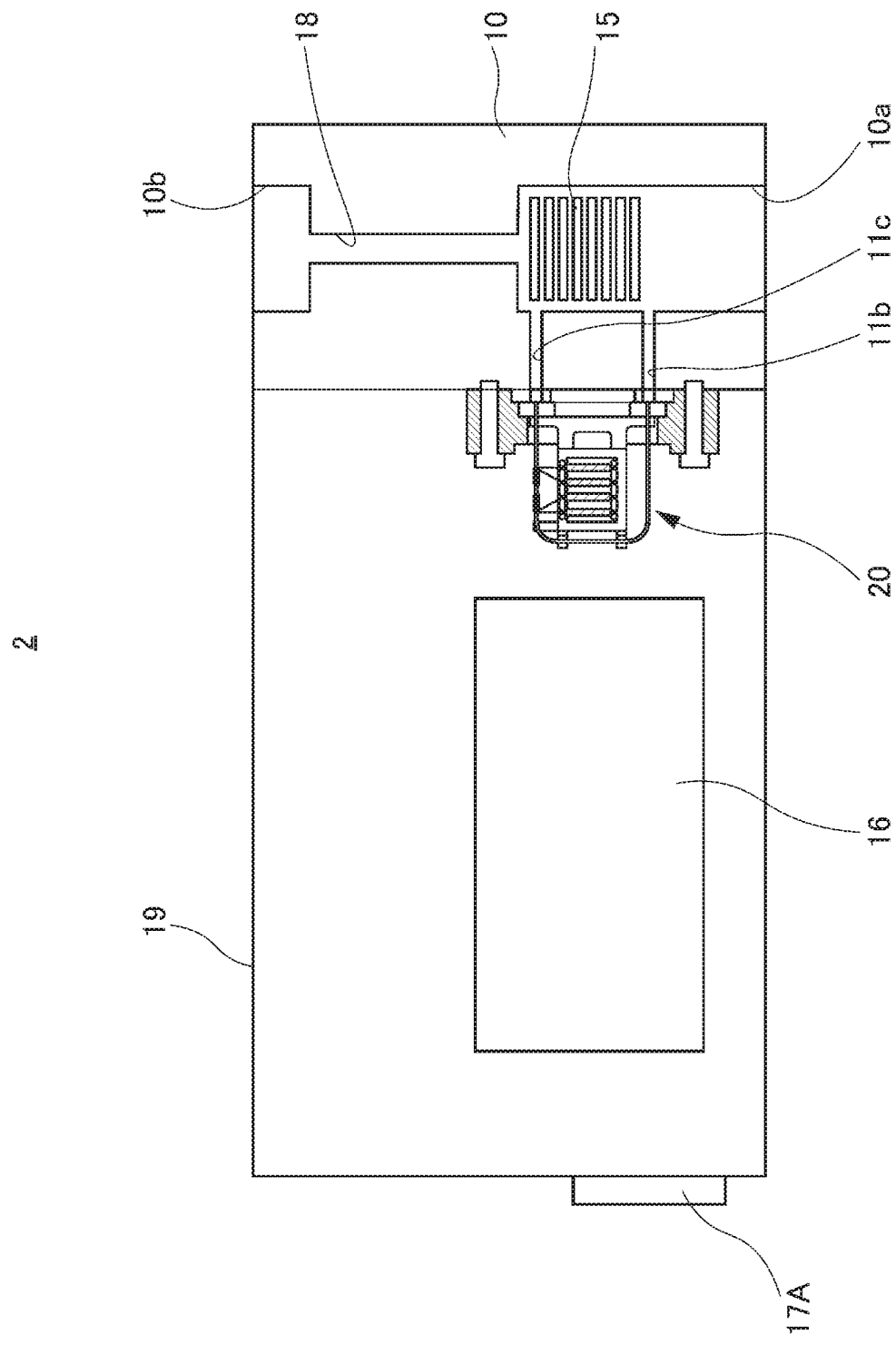
FIG. 3 is a cross-sectional view of a mass flow meter including the mass flow sensor according to the first embodiment of the present invention.

FIG. 3 is a cross-sectional view of the mass flow meter 2 including the mass flow rate sensor 20 according to the first embodiment of the present invention.

Note that the upper and lower portions in FIG. 3 indicate the upper and lower portions in normal use.

Also in the second embodiment, since much of the basic configuration is the same as that of the first embodiment, differing points will be mainly described below, and the description of the same points as those of the first embodiment may be omitted.

Since the mass flow meter 2 does not require flow control, the flow rate control valve 14 provided in the mass flow controller 1 of FIG. 1 is omitted as shown in FIG. 3.

In addition, as the flow rate control valve 14 has been omitted, the second flow path 12b for supplying the fluid to the flow rate control valve 14 shown in FIG. 1 and the fourth flow path 13b for supplying the fluid from the flow rate control valve 14 to the third flow path 13a become unnecessary.

Therefore, the portions of the second main flow path 12 and the third main flow path 13 provided in the main body block 10 in the first embodiment are changed to the outlet-side flow path 18 directly connecting the first flow path 12a of the second main flow path 12 and the third flow path 13a of the third main flow path 13 as shown in FIG. 1.

Further, in the first embodiment, the control unit 16 has a comparison control circuit for comparing the set flow rate and the flow rate flowing in the main flow path to control the flow rate control valve 14, but this comparison control circuit has been omitted because it is unnecessary.

Then, in the first embodiment, the input/output unit 17 (e.g., an input/output connector) electrically connected to the control unit 16 is provided, and the reception (input) of the signal relating to the set flow rate input from the external device and the transmission (output) of the signal relating to the flow rate of the fluid in the main flow path to the external device are enabled, but in the mass flow meter 2, at least the signal relating to the flow rate of the fluid in the main flow path is enabled to be transmitted (output) to the external device.

Therefore, in the second embodiment, instead of the input/output unit 17 of the first embodiment, a signal relating to the flow rate of the fluid in the main flow path can be transmitted (output) to an external device as the output unit 17A electrically connected to the control unit 16.

However, the output unit 17A need only have a function of transmitting (outputting) a signal relating to the flow rate of the fluid in the main flow path to an external device, and therefore need not have only a function of transmitting (outputting) a signal relating to the flow rate of the fluid in the main flow path to the external device, and may have a function of receiving (inputting) some signal from the external device.

Then, the mass flow rate sensor 20 is the same as that of the first embodiment, and therefore, realizing a mass flow meter 2 in which the fluctuation of the 0 output is suppressed in the mass flow meter 2 which flows the fluid in the vertical direction is possible, similar to the case described in the first embodiment.

Although the present invention has been described based on the embodiments described above, the present invention is not limited to the embodiments, and needless to say various modifications can be made without departing from the gist of the present invention.

Accordingly, various modifications within the scope not departing from the gist are included in the technical scope of the present invention, which is obvious to a person skilled in the art from the description of the claims.

The invention claimed is:

1. A mass flow sensor comprising:
a U-shaped flow path passage in which fluid flows from one end portion to another end portion having a bottom portion and two straight portions which connect the bottom portion to the end portions,
a first thermal resistor wound around any one of the straight portions,
a second thermal resistor wound around the straight portion around which the first thermal resistor is wound, and provided away from the first thermal resistor toward the corresponding end portion of the applicable straight portion,
a heat dissipating portion provided so as to be in contact with the flow path tube on a side opposite to the second thermal resistor across the first thermal resistor, and
a weld base having a terminal to which ends of the first thermal resistor and the second thermal resistor are connected, wherein
the heat dissipating portion is provided as an arm portion of the weld base at a position adjacent to the first thermal resistor between the bottom portion and the first thermal resistor of the flow path passage, and
the flow rate of the fluid is obtained based on change in resistance values of the first thermal resistor and the second thermal resistor caused by temperature change when the fluid flows through the flow path passage.

2. The mass flow sensor according to claim 1, wherein the heat dissipating portion is fixed to the flow path passage, and the flow path passage is held by the weld base.

3. The mass flow sensor according to claim 1, wherein the heat dissipating portion is formed of a material having a thermal conductivity of 100 W/m·K or more at 0 degrees.

4. The mass flow sensor according to claim 1, wherein the flow path passage is disposed with the U-shaped opening side directed in a horizontal direction.

5. The mass flow sensor according to claim 1, wherein
the weld base has a plurality of arm portions and holds the flow path passage, and
the arm portion that functions as the heat dissipating portion is one of the plurality of arm portions.

6. A mass flow meter comprising:
a main flow path through which fluid flows,
a mass flow sensor comprising:
a U-shaped flow path passage in which fluid flows from one end portion to another end portion having a bottom portion and two straight portions which connect the bottom portion to the end portions,
a first thermal resistor wound around any one of the straight portions,
a second thermal resistor wound around the straight portion around which the first thermal resistor is wound, and provided away from the first thermal resistor toward the corresponding end portion of the applicable straight portion,
a heat dissipating portion provided so as to be in contact with the flow path tube on a side opposite to the second thermal resistor across the first thermal resistor, and
a weld base having a terminal to which ends of the first thermal resistor and the second thermal resistor are connected, wherein the heat dissipating portion is provided as an arm portion of the weld base at a position adjacent to the first thermal resistor between the bottom portion and the first thermal resistor of the flow path passage, and the flow rate of the fluid is obtained based on change in resistance values of the first thermal resistor and the second thermal resistor caused by temperature change when the fluid flows through the flow path passage, and
an output unit for outputting a signal related to the flow rate of the fluid detected by the mass flow sensor to the outside,
wherein each end of the flow path passage of the mass flow sensor is connected to the main flow path.

7. A mass flow controller comprising:
a main flow path through which fluid flows,
a mass flow sensor comprising:
a U-shaped flow path passage in which fluid flows from one end portion to another end portion having a bottom portion and two straight portions which connect the bottom portion to the end portions,
a first thermal resistor wound around any one of the straight portions,
a second thermal resistor wound around the straight portion around which the first thermal resistor is wound, and provided away from the first thermal resistor toward the corresponding end portion of the applicable straight portion,
a heat dissipating portion provided so as to be in contact with the flow path tube on a side opposite to the second thermal resistor across the first thermal resistor, and
a weld base having a terminal to which ends of the first thermal resistor and the second thermal resistor are connected, wherein the heat dissipating portion is provided as an arm portion of the weld base at a position adjacent to the first thermal resistor between the bottom portion and the first thermal resistor of the flow path passage, and the flow rate of the fluid is obtained based on change in resistance values of the first thermal resistor and the second thermal resistor caused by temperature change when the fluid flows through the flow path passage, and
a flow rate adjustment valve, provided on an outlet side of the main flow path, for adjusting the flow rate of the fluid flowing in the main flow path to a set flow rate based on the flow rate of the fluid detected by the mass flow sensor,
wherein each end of the flow path passage of the mass flow sensor is connected to the main flow path.

* * * * *